United States Patent
Fox et al.

(10) Patent No.: US 7,305,229 B2
(45) Date of Patent: Dec. 4, 2007

(54) PROVIDING SERVICES IN COMMUNICATIONS NETWORKS

(75) Inventors: David Fox, Reading (GB); Gavin Wong, Surrey (GB); Christopher Pudney, Newbury (GB)

(73) Assignee: Vodafone Group PLC, Berkshire (GB)

( * ) Notice: Subject to any disclaimer, the term of this patent is extended or adjusted under 35 U.S.C. 154(b) by 0 days.

(21) Appl. No.: 11/181,005

(22) Filed: Jul. 13, 2005

(65) Prior Publication Data

US 2006/0058021 A1     Mar. 16, 2006

(30) Foreign Application Priority Data

Jul. 14, 2004  (GB) ................. 0415759.0

(51) Int. Cl.
*H04M 11/00* (2006.01)
*H04M 1/00* (2006.01)
*H04Q 7/20* (2006.01)

(52) U.S. Cl. ............... 455/406; 455/408; 455/422.1; 455/550.1; 455/556.2

(58) Field of Classification Search .. 455/554.1–554.2, 455/556.2, 560–561, 435.1–435.3, 432.1, 455/432.2, 432.3, 426.1, 426.2, 424–425, 455/405–411, 422.1, 551, 436–451, 445, 455/550.1, 552.1, 556.1, 557–558, 433–434, 455/456.3, 524–525, 41.2, 415; 370/253, 370/312–314, 389–394, 395.1, 396–399, 370/395.3, 395.5, 395.51, 395.2, 395.4, 328, 370/338, 349, 395.52, 395.53; 709/203, 709/226, 218–219, 228–229; 379/114.21

See application file for complete search history.

(56) References Cited

U.S. PATENT DOCUMENTS 6,327,349 B1 * 12/2001 Rollins ................. 379/114.27
6,434,537 B1 *  8/2002 Grimes ........................ 705/40

(Continued)

FOREIGN PATENT DOCUMENTS

EP      1 301 052 A3    4/2003

(Continued)

OTHER PUBLICATIONS

Ostrowski Frank: "Roaming und Handover zwischen UMTS und Funk-LAN" NTZ (Nachrichtentechnische Zeitschrift), VDE Verlag GMBH.., Berlin, DE, vol. 55, No. 6, 2002, pp. 24-26, XP00124094. ISSN: 0948-728X.

(Continued)

*Primary Examiner*—Meless Zewdu
(74) *Attorney, Agent, or Firm*—Workman Nydegger

(57) ABSTRACT

This disclosure is concerned with systems and methods for network communications. In one example, a cellular telecommunications network includes a radio access network with multiple geographically distributed cells, and further includes a core network for providing cellular telecommunications network functions to devices registered therewith over a cellular telecommunications network bearer. The cellular telecommunications network is adapted to provide core network cellular telecommunications network functions to devices registered therewith over a non-cellular telecommunications network bearer via another access network including a plurality of access points. Further, the core network is configured to receive an identifier of said other access network when a device communicates with the core via an access point and selects a charge for providing telecommunications services in dependence upon the value of that identifier.

44 Claims, 6 Drawing Sheets

U.S. PATENT DOCUMENTS

| | | | |
|---|---|---|---|
| 6,741,693 | B1 | 5/2004 | Madoch et al. |
| 6,785,535 | B2 * | 8/2004 | Lucidarme et al. .......... 455/406 |
| 6,865,262 | B1 * | 3/2005 | Mitts et al. ............ 379/114.02 |
| 6,990,339 | B2 * | 1/2006 | Turanyl et al. .......... 455/432.1 |
| 7,050,416 | B2 * | 5/2006 | Bichot et al. ................ 370/338 |
| 7,058,165 | B2 * | 6/2006 | Koskinen et al. ...... 379/115.03 |
| 7,107,620 | B2 * | 9/2006 | Haverinen et al. ............ 726/29 |
| 2003/0050076 | A1 | 3/2003 | Wantanabe |
| 2003/0157923 | A1 | 8/2003 | Juha et al. |
| 2004/0058692 | A1 | 3/2004 | Kall et al. |
| 2005/0232189 | A1 * | 10/2005 | Loushine .................... 370/328 |

FOREIGN PATENT DOCUMENTS

| | | | |
|---|---|---|---|
| EP | 1 427 225 A2 * | 6/2004 | |
| GB | 2 367 213 A | 3/2002 | |
| GB | 2 376 845 | 12/2002 | |
| GB | 2 387 069 A | 10/2003 | |
| WO | WO 99/30293 | * | 6/1999 |
| WO | WO 9930293 A | * | 6/1999 |
| WO | WO 03/032618 A1 | 4/2003 | |
| WO | WO 03/032656 A1 | 4/2003 | |
| WO | WO 03/096628 A1 | 11/2003 | |
| WO | WO 03/098959 A1 | 11/2003 | |
| WO | WO 2004/002051 A3 | 12/2003 | |
| WO | WO2004/017565 | 2/2004 | |

OTHER PUBLICATIONS

European Search Report dated Jul. 10, 2006 in corresponding EPO Application No. EP05254397.

* cited by examiner

PROVIDING SERVICES IN COMMUNICATIONS NETWORKS

CROSS-REFERENCE TO RELATED APPLICATIONS

This Application claims the benefit of United Kingdom Patent Application No: GB 0415759.0 entitled PROVIDING SERVICES IN COMMUNICATIONS NETWORKS, filed Jul. 14, 2004, which is incorporated herein in its entirety by this reference.

BACKGROUND OF THE INVENTION

1. The Field of the Invention

The present invention relates to providing services in communications networks.

BRIEF SUMMARY OF EXEMPLARY EMBODIMENTS OF THE INVENTION

According to a first aspect of the invention, there is provided a GSM or the like cellular telecommunications network including a radio access network and a core network for providing GSM or the like functions to devices registered therewith over a GSM or the like bearer; wherein the radio access network comprises a plurality of geographically distributed cells, and the cellular telecommunications network being adapted to provide core network GSM or the like functions to devices registered therewith over a non-GSM bearer via another access network including a plurality of access points, and wherein said core network receives an identifier of said other access network when a device communicates with the core via an access point and selects a charge for providing telecommunications services in dependence upon the value of that identifier.

According to a second aspect of the invention, there is provided a method of operating a GSM or the like cellular telecommunications network including a radio access network and a core network for providing GSM or the like functions to devices registered therewith over a GSM or the like bearer; wherein the radio access network comprises a plurality of geographically distributed cells, and the cellular telecommunications network being adapted to provide core network GSM or the like functions to devices registered therewith over a non-GSM bearer via another access network including a plurality of access points, the method including receiving an identifier of said other access network when a device communicates with the core via an access point and selecting a charge for providing telecommunications services in dependence upon the value of that identifier.

According to a third aspect of the invention, there is provided a GSM or the like cellular telecommunications network including a radio access network and a core network for providing GSM or the like functions to devices registered therewith over a GSM or the like bearer; wherein the radio access network comprises a plurality of geographically distributed cells, and the cellular telecommunications network being adapted to provide core network GSM or the like functions to devices registered therewith over a non-GSM bearer via another access network including a plurality of access points, and including means for receiving an identifier of a said device before or when that device communicates with the core via the access point for rendering a charge for using said other access network in dependence upon the value of that identifier and/or the duration between receiving two identifiers of the same device.

According to a fourth aspect of the invention, there is provided a GSM or the like cellular telecommunications network including a radio access network and a core network for providing GSM or the like functions to devices registered therewith over a GSM or the like bearer; wherein the radio access network comprises a plurality of geographically distributed cells, and the cellular telecommunications network being adapted to provide access to another telecommunication network via its access network, and including means for determining the source of communications between said radio access network and said other telecommunications network.

These and other aspects of the exemplary embodiments of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Figure 1:
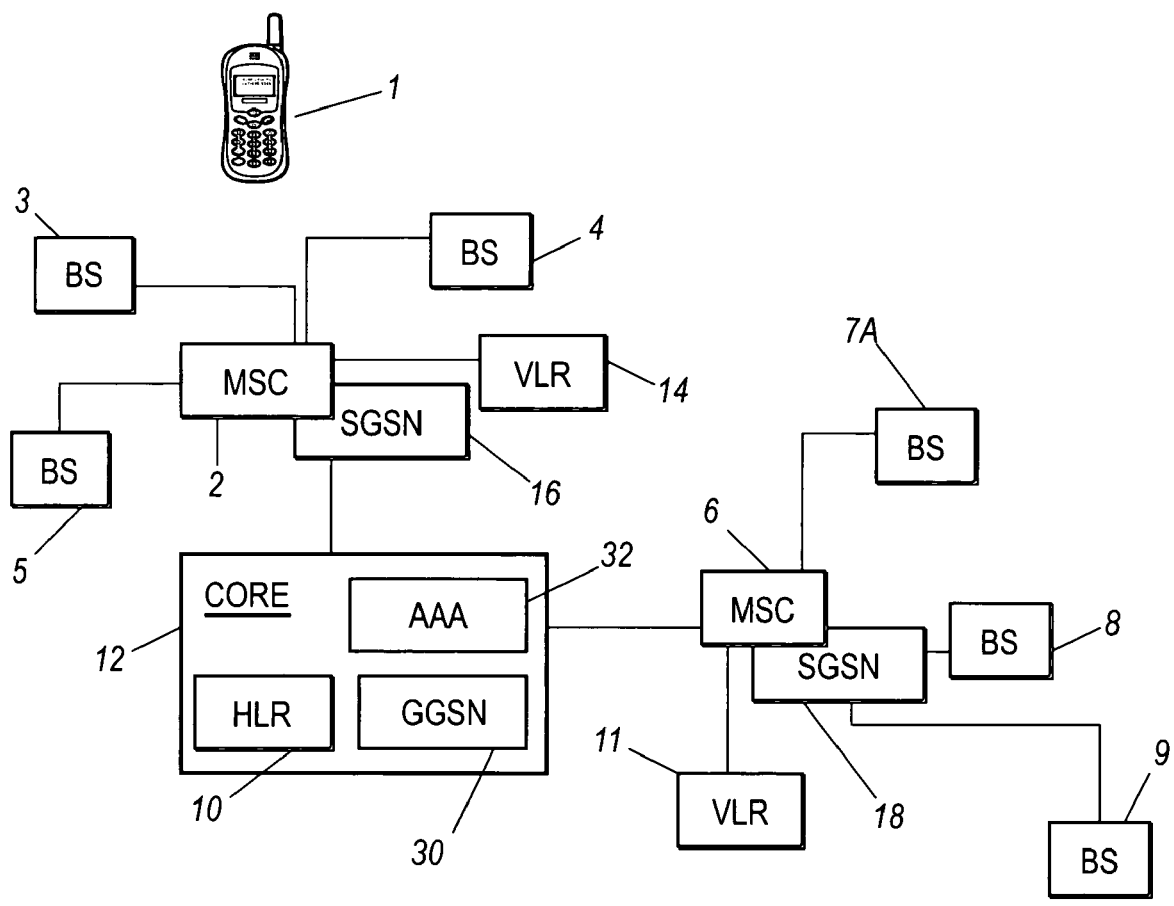
FIG. 1 is a diagrammatic drawing of key elements of a GSM mobile telephone network for use in explaining the operation of such a network.

Various elements of a mobile telecommunications network, and its operation, will now briefly be described with reference to FIG. 1.

Each base station (BS) corresponds to a respective cell of its telecommunications network and receives calls from and transmits calls to a mobile terminal in that cell by wireless radio communication. Such a subscriber's mobile terminal or mobile station (MS) is shown at 1. Each base station comprises a base transceiver station (BTS) and a base station controller (BSC). A BSC may control more than one BTS. The BTSs and BSCs comprise the radio access network.

The base stations are arranged in groups and each group of base stations is controlled by a mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data, such as the current or last known location of the subscriber's mobile terminal.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) via the base station 3 associated with the particular cell in which the terminal 1 is located. The base station 3 then routes this IMSI to the MSC 2 with which the BS 3 is registered.

MSC 2 now accesses the appropriate location in the HLR 10 present in the network core 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When a mobile terminal registers with the GSM network, the base station 3 passes the Cell Global Identity (CGI) of the cell used in the GSM network. The current CGI of the mobile terminal is stored by the network core 12. The CGI is a concatenation of the location area (LA) and the cell identity and uniquely identifies a given cell. The mobile terminal may also store the CGI, read from the system information on the cell, on its SIM.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding serving gateway support modes (SGSNs) 16 and 18 are provided to support communications in the packet switched domain—such as GPRS data transmissions. The core network 12 includes Gateway GPRS Support Node (GGSN) 30 which provides an interface between the mobile network and an external IP network (not shown)—for example by performing protocol conversion between the GPRS and IP environments.

The core network 12 also includes Access, Authorization and Accounting (AAA) server 32. This is a security system that determines the identity and privileges of a mobile terminal and tracks that mobile terminal's activities.

GSM offers multiple "services" to end users. In the GSM Specifications, services are grouped in 3 categories.

1. Bearer Services: A bearer service is used for transporting user data. Examples of bearer services are:
    Asynchronous and synchronous data, 300-9600 bps.
    Alternate speech and data, 300-9600 bps.
    Asynchronous PAD (packet-switched, packet assembler/disassembler) access, 300-9600 bps.
    Synchronous dedicated packet data access, 2400-9600 bps.

2. Tele-Services: These include both speech and data services. Examples of tele-services are:
    Telephony.
    Facsimile group 3.
    Emergency calls.
    Teletex.
    Short Message Services.
    Fax mail.
    Voice mail.

3. Supplementary Services: These are offered as improvements to the above tele-services. They enable the user to have better control of the basic services. Examples of supplementary services are:
    Call Forwarding.
    Call Barring.
    Call hold. Puts an active call on hold.
    Call Waiting.
    Advice of Charge.
    Multiparty service.
    Calling Line Identification.

The foregoing is intended to be merely a simplified description of the normal operation of the GSM network. In practice, other procedures will be carried out.

There have recently been proposals to allow access to the features and services provided by GSM networks other than by accessing those networks in the conventional manner by wireless signaling between the mobile terminal and the base station providing coverage in the cell occupied by the mobile terminal using GSM communication protocols. It has been proposed to provide network access points (APs), for example at a subscriber's home. A modified GSM terminal is provided with the facility to additionally communicate with the access point by any suitable technology, for example by a Bluetooth (RTM) connection or Wireless Local-Area Network (WLAN). A protocol for communication between such a mobile terminal and an access controller has been developed and is called "unlicensed mobile access" (UMA), and allows GSM features to function using non-GSM bearer technologies.

Figure 2:
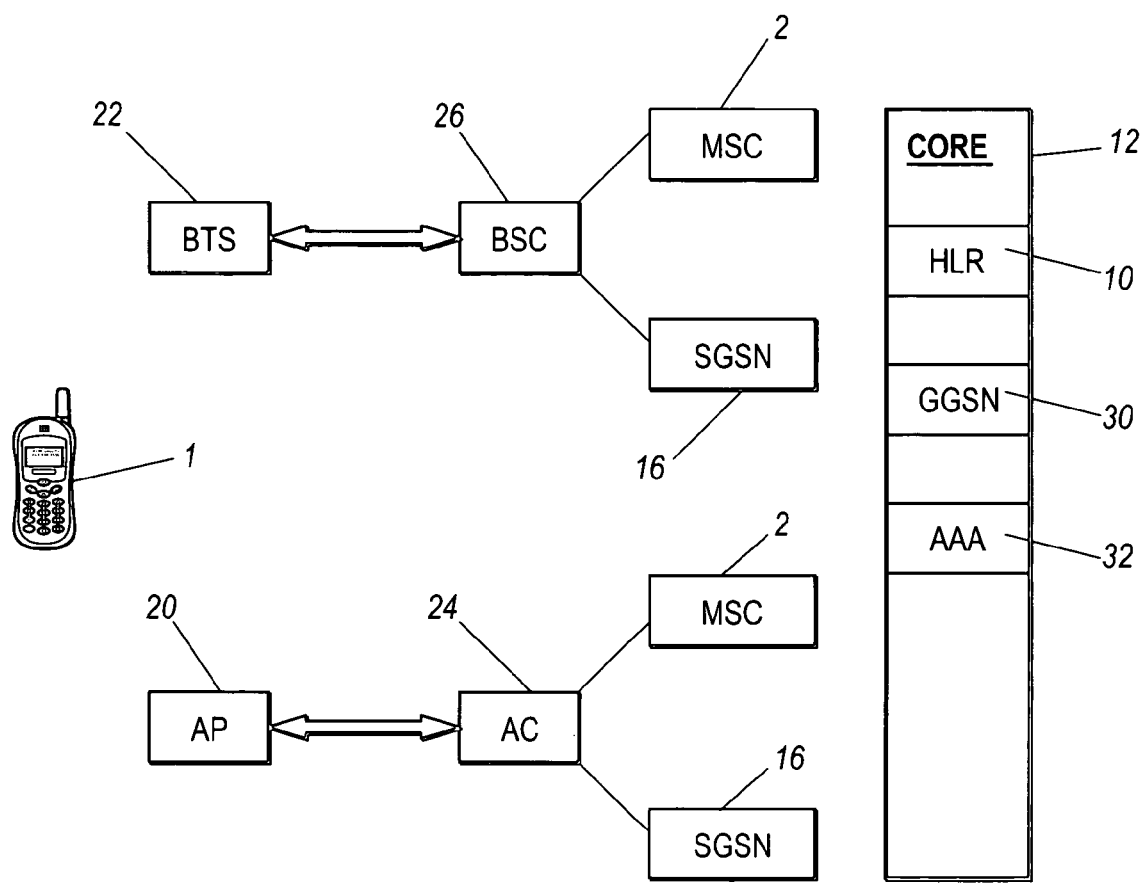
FIG. 2 shows a modified GSM mobile telephone network for receiving IP-based communications from a non-GSM access point.

FIG. 2 shows elements for providing access to a GSM network by both a conventional GSM bearer and a non-GSM bearer. As indicated above, an AP 20 provides a radio link to mobile terminal 1, although a link by a cable or other means such an infra-red is also possible. The AP 20 performs a role corresponding to that of a GSM base station transceiver (BTS) 22.

An access controller (AC) 24 is provided which performs a function analogous to that of a GSM BSC 26. Communications linking the access point 20 and the access controller 24 are IP based communications, and may be, for example, transmitted over a broadband IP network (and routed via the Internet). The access controller utilizes the IP based connection provided through the access point to communicate to the modified GSM terminal and reuses the signaling in conventional GSM networks between the base station controller 26 and MSC 2/SGSN 16 for the communication to the MSC 2/SGSN 16.

At this point it should be appreciated that mobile telecommunications networks, with their geographically distributed BTSs, BSCs, MSCs and SGSNs, have been developed to allow subscribers to make and receive calls at any point, and whilst moving around, within the network coverage area. The complex location signaling between the mobile terminal and the components of the network is provided to enable this operation throughout the coverage area of the network. The considerations for fixed IP based communications are very different. Data received from the mobile terminal at the access point 20 is transmitted via any IP network (such as the Internet).

The procedure when a mobile terminal is activated in an area served by access point 20 will now be described with reference to FIGS. 3, 4A and 4B. When a mobile terminal is activated in an area served by access point 20, a WLAN link is established.

Figure 3:
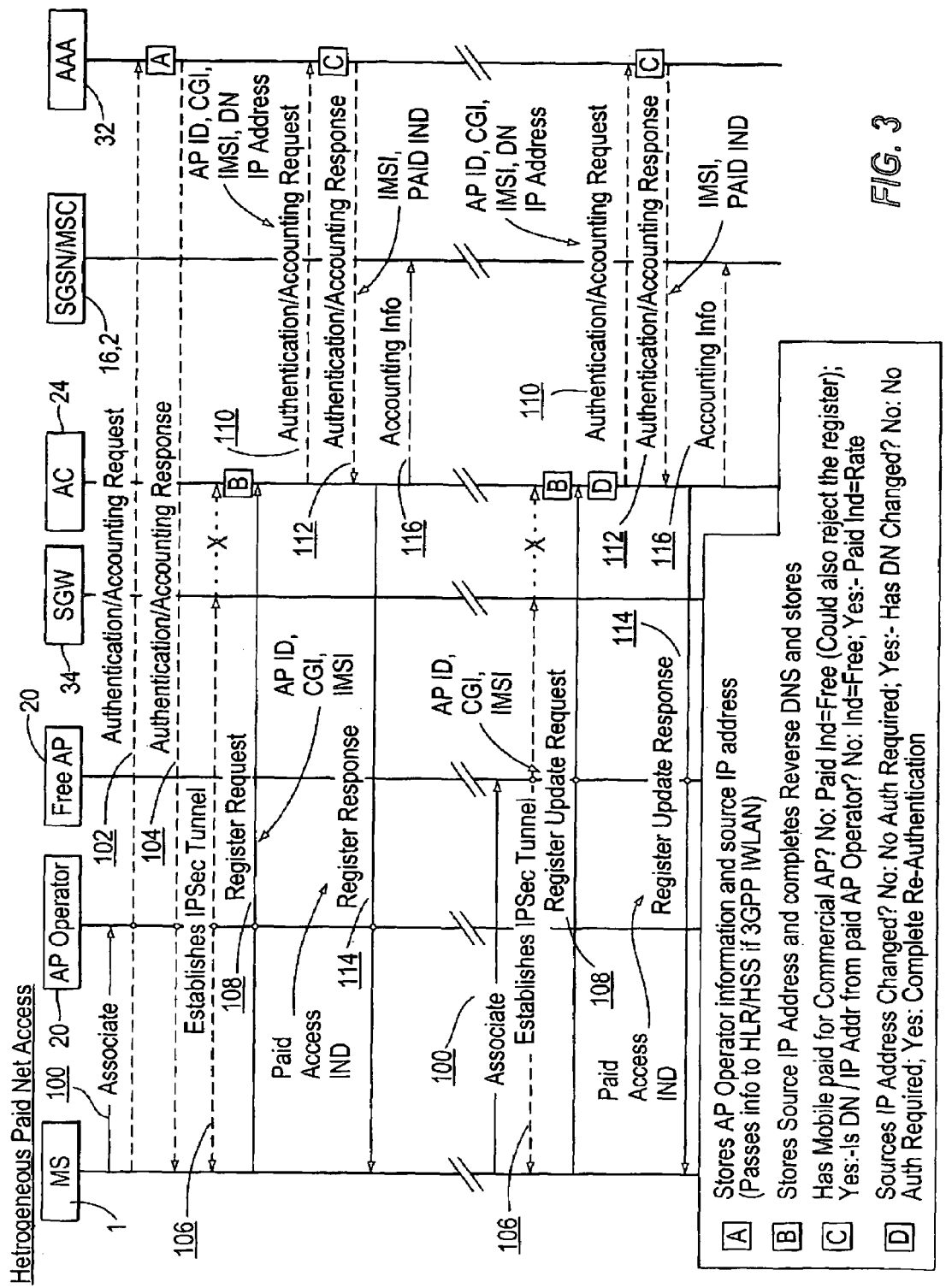
FIG. 3 shows the messages exchanged between the network elements during authentication of a terminal.
Figure 4A:
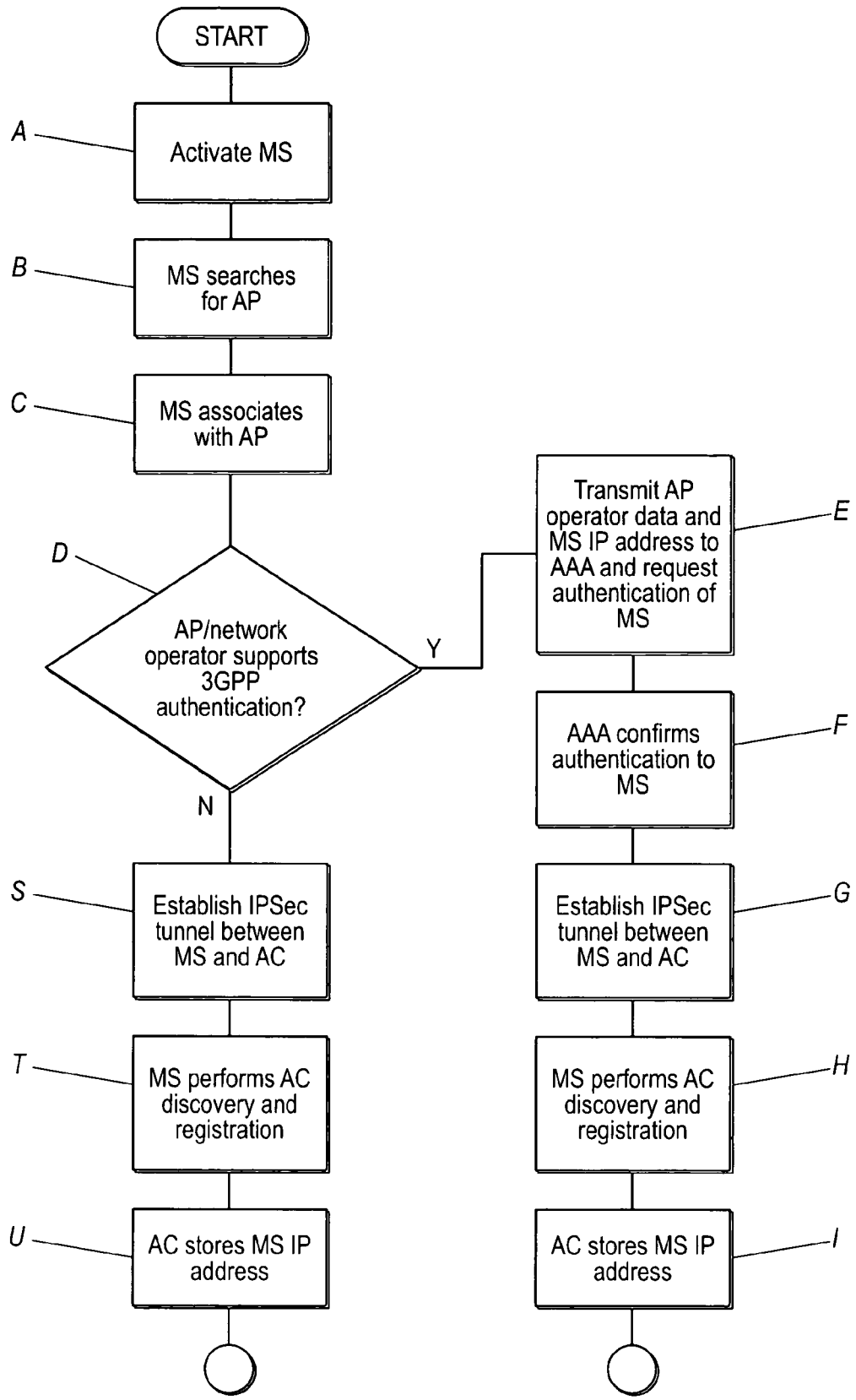
FIGS. 4A and 4B show the steps performed during authentication of a mobile terminal.
Figure 4B:
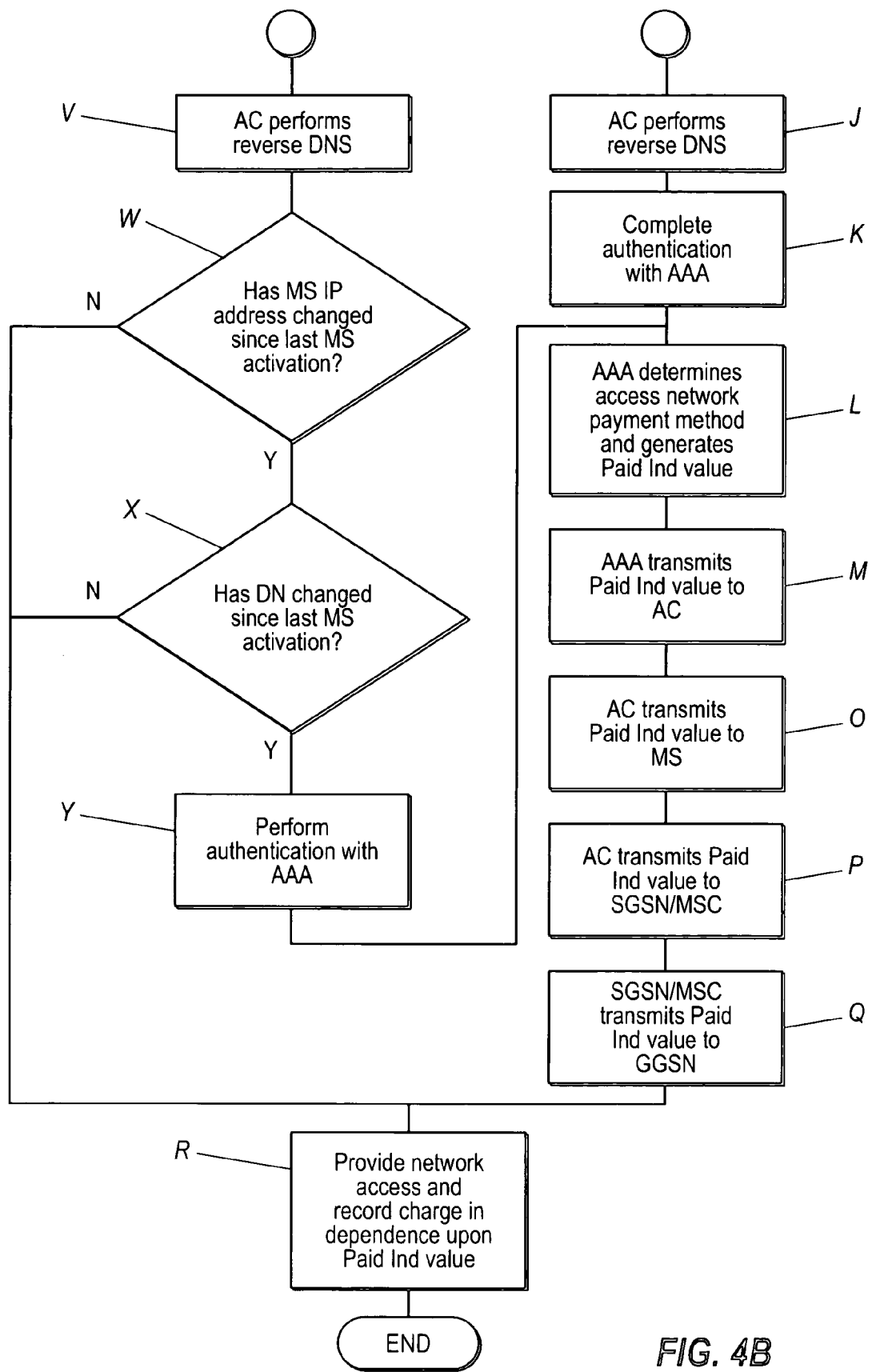

At step A of the flow chart of FIGS. 4A and 4B the mobile terminal is activated in the area served by the access point 20 and generates an "Associate" message 100 (FIG. 3). At step B the mobile terminal searches for the access point 20, and at step C the mobile terminal associates with the access point 20. During the process of associating the mobile terminal with access point 20, the access point 20 allocates and provides an IP address to the mobile terminal 1 for use in communications via the access point 20.

It is envisaged that some access points 20 will be configured to provide authentication of mobile terminals with the network core 12. However, some access points will not have this functionality. At step D it is determined whether access point 20 can perform authentication of the mobile terminal 1 by the challenge and response exchange, described earlier, with core 12.

Assuming that authentication is possible, at step E authentication of the mobile terminal is requested from the AAA server 32 present in the core network 12 by issuing an "Authentication/Accounting Request" message 102.

At step E the mobile terminal transmits access point 20 operator information, which implicitly includes the IP address of the mobile terminal 1 for addressing. This data may be passed to the HLR 10 of the core 12.

At step F the AAA server 32 transmits an "Authentication/Accounting Response" reply message 104 to the mobile terminal 1 which confirms that the mobile terminal is authenticated.

At step G an IPSec tunnel 106 is established between the mobile terminal and a signaling gateway (SGW) 34. The SGW 34 may be part of the access controller 24, or may be a separate entity. The SGW 34 terminates the IPSec connection from the mobile terminal 1, i.e. it allows secure IP connection to access controller 24 from the mobile terminal 1.

At step H the mobile terminal 1 performs access controller discovery and registration. The access controller 24 then stores the IP address allocated to the mobile terminal 1 by the access point 20 (step I). At step J the access controller 24 analyses the IP address of the mobile terminal 1 allocated by the access point 20. The EP address will have a corresponding domain name—such as "vodafone.co.uk". A domain name server (DNS) maintains a database of IP addresses and the corresponding domain names. The domain names may comply with the X.500 standard or may have any other suitable format. At step J the access controller 24 passes the EP address allocated to the mobile terminal 1 to the DNS, which performs a reverse-DNS function to obtain the domain name from the IP address. The domain name thus obtained is stored by the access controller 24. The IP address allocated by the access point 20 and its corresponding domain name may be indicative of the identity of the access point.

The mobile terminal 1 then issues a "Register Request" message 108 to the access controller 24, including the access point ID, CGI and the mobile terminal's IMSI. When the access controller 24 receives this information it issues an "Authentication/Accounting Request" message 110 to the AAA server 32, which request includes the access point 24 ID, CGI, IMSI, domain name and IP address allocated to the mobile terminal 1 (step K).

At step L the AAA server 32 attempts to determine on what basis the access network (comprising access point 24 and access controller 20) is provided to the mobile terminal 1 (that is the commercial arrangement—if any—between the access network, the mobile terminal user and/or the cellular network). The AAA server 32 determines this using the IP address and domain name passed thereto in steps E and K.

The AAA server 32 may alternatively determine on what basis the access network is provided to the mobile terminal 1 using the access point ID passed thereto in step K.

Whichever of the IP address, domain name or access point ID is useful to determine on what basis the access network is provided to the mobile terminal 1 will depend on the basis that those values are assigned. For example, if the access point ID is a MAC address of a WLAN access point in a user's home, then the ID is unlikely to be useful (although a change in the value will indicate that the mobile terminal has changed the access point to which it is connected).

Although the IP address may not identify the access point itself, it will often provide an indication of the access network of which the access point forms a part. If all the access points provided by an access network are provided for use on the same basis to a subscriber, then identifying the access network (rather than the particular access point) will be sufficient.

The AAA server 32 determines whether the access network is provided free (which might occur in an hotel lobby or university campus, for example), whether the access network has been paid in advance by the user of mobile terminal 1, for example, with a credit card (as might be done at a business centre at an airport), or whether the operator of the mobile telecommunications network is required to make a payment to the access network in order to allow mobile terminals registered therewith to obtain services therefrom.

A payment indicator value "Paid Ind" is calculated.

For example, Paid Ind may be calculated on the following basis. If it is determined that no charge is made for use of an access point 24, the value of Paid Ind is "free". If it is determined that the access point 24 provides service for a charge, it is then determined if the domain/IP address is from an access point that is paid directly by the cellular network operator. If the access point is not paid directly by the cellular network operator (but is paid by the user of the mobile terminal 1) then the value Paid Ind is set to "free"; if it is, the value of Paid Ind is "rate".

It should be understood that Paid Ind may have more than two different values, thereby allowing a multiplicity of different charging regimes.

The Paid Ind value, and thus the charge to the user for using telecommunications services, may also be varied in dependence upon the CGI value. This CGI value may be then CGI transmitted in the message 110 (and obtained from the mobile terminal's SIM) or the last CGI value stored for the mobile terminal in the network core. For example, it may be desired to charge a lower rate for use of an access point that it is an area determined to be within the home GSM cell of the mobile terminal subscriber (that is, a particular cell designated by the subscriber for a special call rate).

At step M the value of Paid Ind is transmitted to the access controller 24, together with the IMSI of the mobile terminal 1 in "Authentication/Accounting Response" message 112. At step N the access controller 24 transmits the Paid Ind value in a "Register Response" message 114 to the mobile terminal. The access controller 24 then selects a SGSN16/MSC2 for use in communicating with the core network. The SGSN16/MSC 2 may be selected in dependence upon the CGI value (from the core network or SIM of the mobile terminal). The access controller 24 transmits, at step O, the Paid Ind value to the SGSN 16/MSC 2 in an "Accounting Info" message 116. The Accounting Info message could be passed implicitly to the SGSN 16/MSC 2 by mapping the value onto different parameters. At step P this indication is forwarded to the GGSN 30 when the mobile terminal activates a PDP context for the purpose of flow based charging. The PDP context defines parameters that support the flow of data traffic to and from the mobile terminal 1. Among the parameters that are set are the identifier of the external packet data network with which terminal 1 wishes to communicate, a PDP address recognized in that network (for example, the IP address allocated to the mobile terminal), the address of the GGSN 30, quality of service (QoS) parameters etc. The indication is then used by a charging/billing system to determine the charging to be applied for services used by or delivered to the mobile terminal 1.

At step R the mobile terminal is provided with network access, and the charge for network access is recorded against the user's account with the cellular network operator in dependence upon the Paid Ind value.

For example, the charge rendered to the user of mobile terminal 1 may be calculated so that the total cost to the user for network access will be the same irrespective of whether the access point is provided free of charge, is pre-paid or requires a payment from the mobile telephone network operator. If an access point is provided free of charge, the cellular operator will charge more for access to its radio access network than if a payment must be made use of an access point. The total charge (including charges for use of the radio access network and use of the access point, if any) to the user will be the same. This is advantageous because the user of mobile terminal 1 will know the cost of obtaining network access will be the same, without requiring any knowledge of the commercial basis on which the access point 20 is provided.

However, alternative charging schemes may be used. For example, the user may be charged in the following way. The core network may make a fixed charge for a call of say five pence per minute (this is the charge for use of the core network and does not include an element for use of the GSM radio access network or the alternative access network). An additional charge is made for use of the radio access network/alternative access network. The charge rendered for use of the alternative access network may be one pence per minute if no charge is made for use of the access point (to either the user of the mobile terminal 1 or to the network core)—i.e. the value of Paid Ind is "free". If the access point is paid for directly by the core, then the value of Paid Ind will be "rate" and the charge made for use of the alternative access network may be more, say three pence per minute. Use of the GSM radio access network may be charged at a different rate, say four pence per minute. It can be seen that the total charge (i.e. core network charges plus access network charges) will vary from six pence per minute when using a free access point, eight pence per minute when using an access point paid for directly by the core network, and nine pence per minute when using the conventional GSM radio access network.

When such a charging regime is used, it is advantageous for the user of the mobile terminal to be provided with an indication of the charge that will be made for using the access network. This indication may be a visible indication (for example, an appropriate icon displayed on the screen of the mobile terminal) and/or an audible indication (for example a beep or sequence of beeps made by the loudspeaker of the mobile terminal). This indication will preferably indicate whether the mobile terminal is using the GSM radio access network, using the alternative access network when the access point is provided for free, and using the alternative access network, where the access point is provided for a charge made directly to the core network. When the user of the mobile terminal pays for use of the access point directly, the AAA server 32 will not necessarily be aware of this arrangement and the value of Paid Ind will be "free". Therefore, the mobile terminal will not provide an indicator of charging on this basis. However, the user of the mobile terminal will be aware that they have made a direct payment for use of the access point.

Returning now to step D, if it is determined at that step D that authentication between the mobile terminal 1 and the AAA server 32 is not possible, the information stored on the AAA server 32 (from a prior authentication) is no longer valid.

At step S a IPSec tunnel 106 is established in a similar manner to at step G. At step T the mobile terminal performs access controller 24 discovery and registration in a similar manner to step H described above. At step U. The access controller 24 stores the IP address allocated to the mobile terminal in a similar manner to that performed at step I. As step V the access controller 24 performs a reverse DNS of the IP address allocated to the mobile terminal in a similar manner to step J.

At step W the mobile terminal 1 has sent a "Register Update Request" message 108 to access controller 24 which includes the access point ID, CGI and IMSI of the mobile terminal. If it is determined at the access controller 24 that the IP address has not changed since the mobile terminal was last activated, network access is then provided and the charge levied according to the last calculated value of Paid Ind (calculated last time the mobile terminal was authenticated with the AAA server 32).

However, if it is determined at step W that the EP address of the mobile terminal has changed, it is then determined at step X whether the domain name has changed since the mobile terminal was last activated (and authenticated with the AAA server 32). If it is determined at step X that the domain name has not changed, network access is then provided at step R and a charge is rendered in dependence upon the Paid Ind value last calculated when the mobile terminal was authenticated with the AAA server 32.

However, if it is determined at step X that the domain name has changed, the access controller 24 then transmits an "Authentication/Accounting Request" message 110 to the AAA server 32, which includes the access point ID, CGI, IMSI, domain name and IP address of the mobile terminal 1. Steps L to R are then performed in the manner described above in order to generate a new Paid Ind value and provide network access.

Figure 5:
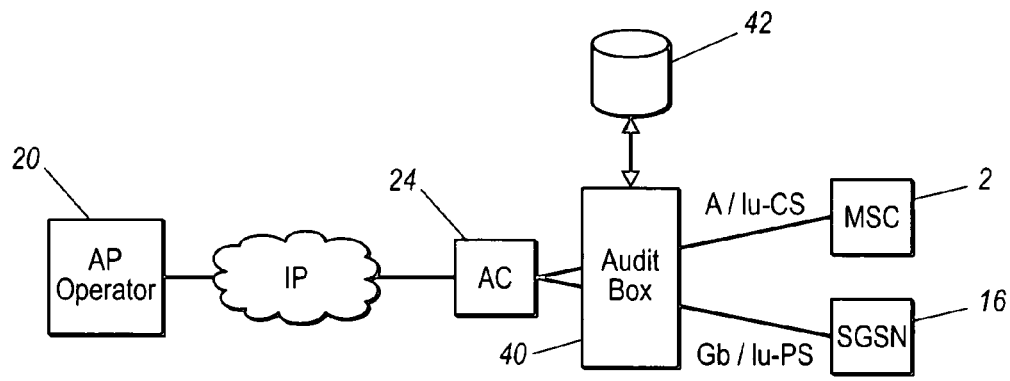
FIGS. 5, 6 and 7 show arrangements for auditing use of telecommunications resources.

FIG. 5 shows an arrangement that allows the source of communications from an access network comprising access point 20 and access controller 24 to be determined. In the FIG. 5 embodiment the access point selects IP addresses or port numbers for allocation to different mobile devices, in dependence upon the category of that device. Respective ranges of IP address or port numbers may be allocated to devices in respective categories. The category of the device may be dependent upon the mobile or fixed telecommunications network with which that mobile terminal is directly subscribed. For example, access points may be provided by a fixed telephone network (PSTN) provider in their subscribers' homes. The fixed telephone network operator will allow users directly subscribed to mobile telecommunications networks to route communications through the access point but may wish to identify the source of any such communications so that appropriate charges can be applied. For example, calls originated by a user directly subscribed to the fixed telephone network may be charged directly to that user by including them on that user's telephone bill in the conventional manner. Charges originating from users directly subscribed with mobile telephone networks may be passed on to those networks so that the mobile telephone networks can seek payment therefore from their subscribers.

It is also possible that a fixed telephone network operator will directly charge the mobile telephone network subscribers for use of their access network; however, the fixed telephone network may wish to charge such users at a higher rate than users directly subscribed with a fixed telephone network.

In accordance with this embodiment a communication auditor 40 is arranged to receive communications between the access controller and the MSC 2/SGSN 16. The call auditor 40 detects activation and deactivation (CONNECT/DISCONNECT/HANDOVER) signaling between the access controller and MSC/SGSN. For each detected activation and deactivation and handover, the communication auditor 40 obtains the identity of the mobile device 1 (such as IMSI, TMSI, P-TMSI or TLLI) and the "Paid Ind" and consults look-up table 42. Look-up table 42 stores identity of the mobile device and the "Paid Ind" together with the corresponding subscriber information. The look up table 42 can then return to the communication auditor 40 subscriber information corresponding to any IP address/support number supplied thereto, thereby allowing the communication auditor to generate charging records so that the correct subscriber is charged for their use of communication resources. Proprietary/standardized signaling would need to be inserted to the MSC and GGSN to allow for real-time billing.

Figure 6:
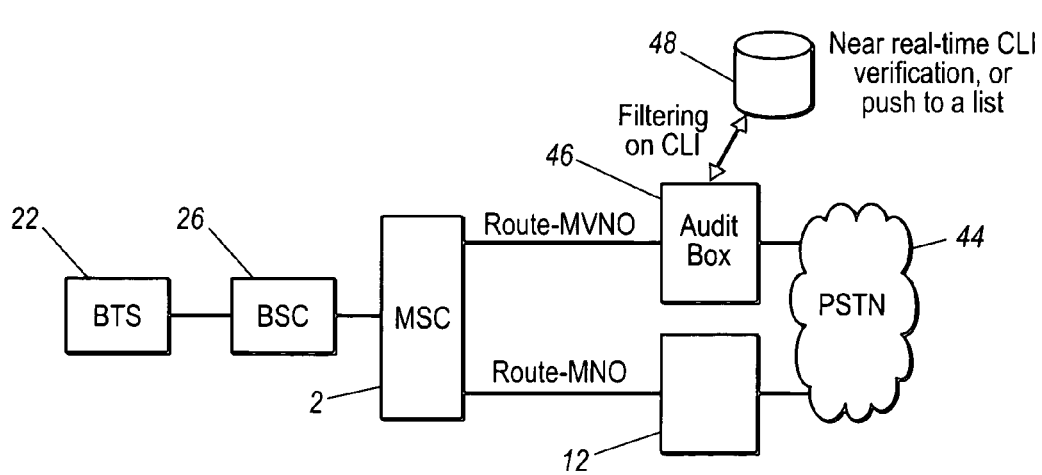
Figure 7:
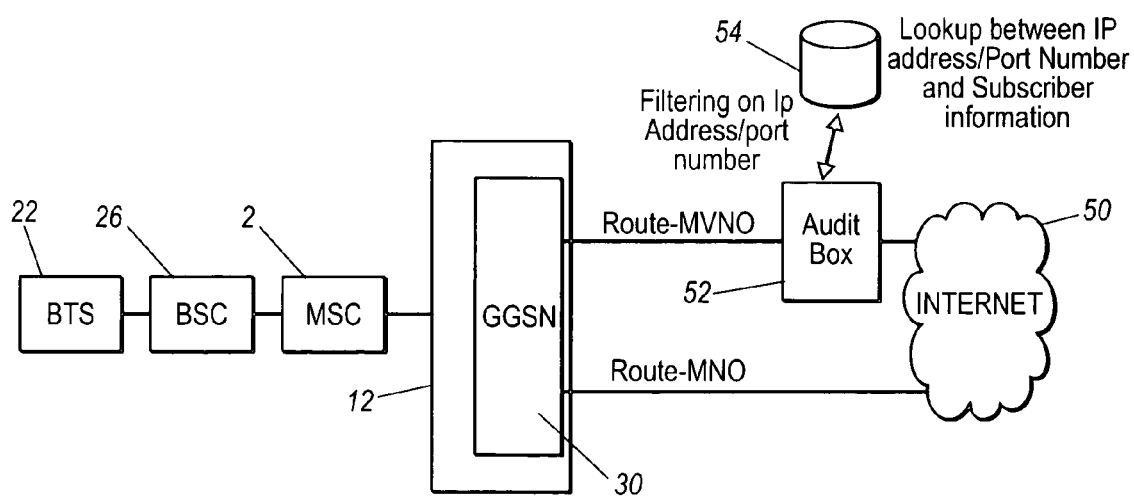

FIGS. 6 and 7 relate to a different arrangement, where a mobile telecommunications network allows its radio access network to be used not only by its subscribers but also by subscribers of another telecommunications network—in this example, a fixed telephone network (PSTN).

In FIG. 6 a mobile terminal 1 makes a call in the circuit switched domain using the local BTS 22 and BSC 26 in the usual manner, although this does not preclude the use of the access point 20 and access controller 24. The call is routed to the appropriate MSC 2. The MSC 2 will analyze the IMSI or MSISDN included in the call signaling and this will enable the MSC 2 to determine whether the call is originated from a user directly subscribed with a mobile telecommunications network or with the fixed telephone network. Calls from users directly subscribed with a mobile telecommunications network will be routed to the core network 12, from where they will be passed into the fixed telephone network 44 if the call party is a subscriber to that network, or to another mobile terminal within the mobile telecommunications network, if the called party is a subscriber to the mobile telecommunications network.

Calls that are from users directly subscribed to the fixed telephone network will be routed from the MSC 2 to the fixed telephone network 44 (that is, the calls from users directly subscribed with a fixed telephone network will use the minimum amount of the mobile telecommunications network infrastructure). However, the routing of the call from the MSC 2 is under control of the mobile telecommunications network, and the fixed telephone network operator may wish to ensure that the calls are indeed correctly routed, and that calls from users directly subscribed with a mobile telecommunications network are not in fact being routed from the MSC 2 directly into the fixed telephone network 44. In this embodiment, a communication auditor 46 detects call signaling between the MSC 2 and the fixed telephone network 44, logs the calling line identity (CLI) and checks this CLI (possibly in real time) against a list of fixed telephone numbers or MSISDNs in database 48. The communications auditor can keep a record of any calls where the CLI is an MSISDN (indicating that the call is originated from the user directly subscribed with a mobile telecommunications network and not directly subscribed with the fixed telephone network). Steps can then be taken to ensure that future calls from users directly subscribed with a mobile telecommunications network are not routed along this path.

FIG. 7 shows an arrangement for monitoring the correct routing of calls in the packet switched domain, analogous to that for monitoring the routing of calls in the circuit switched domain described in relation to FIG. 6. In FIG. 7 GPRS communications received at the GGSN 30 then enter the IP domain and are routed via the Internet 50. To ensure that communications between the GGSN 30 and the Internet 50 are routed along an appropriate channel, in dependence upon whether they are from a user directly subscribed with the fixed telephone network or the mobile telephone network, communications auditor 52 monitors communications along the channel for the fixed telephone network and detects the IP address/port number of those communications. The IP address/port number is passed to database 54 which contains a look-up table of IP addresses/port numbers and corresponding subscriber information. A log can then be maintained of any inappropriately routed communications and corrective action taken.

The term "GSM" used in this specification should be interpreted broadly. The invention is applicable to other telecommunications networks that are similar to GSM networks (in that they have equivalent nodes with equivalent functionality)—such as UMTS (3G), AMPS, D-AMPS, DCS 1800, 1S-41, 1S-54, 1S-95, PCS, CDMA, TDMA networks. The invention is also applicable to developments or extensions to GSM—such as GPRS.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cellular telecommunications network, comprising:
    a radio access network comprising a plurality of geographically distributed cells; and
    a core network for providing cellular telecommunications network functions to devices registered therewith over a cellular telecommunications network bearer,
    wherein the cellular telecommunications network is adapted to provide core network cellular telecommunications network functions to devices registered therewith over a non-cellular telecommunications network bearer via another access network including a plurality of access points, and wherein said core network receives an identifier of said other access network when a device communicates with the core via an access point and selects a charge for providing telecommunications services in dependence upon the value of that identifier, the identifier of said other access network including the IP address of a mobile terminal; and
    wherein when the IP address of the mobile terminal changes, the change in IP address triggers the selection of a charge for providing telecommunications services.

2. The cellular telecommunications network of claim 1, wherein the radio access network comprises a plurality of base stations, each of which serves one of said cells, and the core network comprises a plurality of switching centers, each of said switching centers controlling a plurality of said base stations.

3. The cellular telecommunications network of claim 1, wherein said switching centers comprise GSM Mobile Switching Centers.

4. The cellular telecommunications network of claim 2, wherein said switching centers comprise one of: GSM Serving Gateway Support Nodes; or, other cellular telecommunications network Serving Gateway Support Nodes.

5. The cellular telecommunications network of claim 1, wherein the non-cellular telecommunications network bearer includes a wireless link between the mobile terminal and the access point.

6. The cellular telecommunications network of claim 5, wherein said wireless link comprises a WLAN link.

7. The cellular telecommunications network of claim 5, wherein said wireless link comprises a link using unlicensed spectrum.

8. The cellular telecommunications network of claim 1, wherein said non-cellular telecommunications network bearer comprises an IP-based communications link.

9. The cellular telecommunications network of claim 8, wherein said IP-based communications link includes the Internet.

10. The cellular telecommunications network of claim 1, wherein the identifier of said another access network is obtained by determining the domain name corresponding to the IP address of the mobile terminal allocated by the access point.

11. The cellular telecommunications network of claim 10, wherein when the domain name changes, the domain name change triggers the selection of a charge for providing telecommunications services.

12. The cellular telecommunications network of claim 10, wherein said domain name is obtained from a Domain Name Server.

13. The cellular telecommunications network of claim 1, further comprising means for authenticating said devices with the core network when said devices obtain functions therefrom via said radio access network.

14. The cellular telecommunications network of claim 1, further comprising means for authenticating said devices with the core network when said devices obtain functions therefrom via said other access network.

15. The cellular telecommunications network of claim 14, wherein said charge is selected in dependence upon whether said authentication means is able to authenticate a device connected to a particular access point.

16. The cellular telecommunications network of claim 1, wherein the charge is selected in dependence upon a commercial relationship between the user of said device and said other access network.

17. The cellular telecommunications network of claim 1, wherein the charge is selected in dependence upon a commercial relationship between said other access network used by said device and the cellular telecommunications network.

18. The cellular telecommunications network of claim 1, wherein the network is a GSM network.

19. The cellular telecommunications network of claim 1, wherein the network is a 3G (UMTS) network.

20. The cellular telecommunications network of claim 1, further comprising means for indicating the selection of a charge for using telecommunications services to the user of the mobile terminal.

21. The network of claim 20, wherein said indicating means indicates said charge.

22. The network of claim 1, wherein the charge for providing telecommunications services is selected in dependence upon the cell last determined to be occupied by the mobile terminal.

23. A method of operating a cellular telecommunications network, where the cellular telecommunications network includes a radio access network and a core network for providing cellular telecommunications network functions to devices registered therewith over a cellular telecommunications network bearer, wherein the radio access network comprises a plurality of geographically distributed cells, and the cellular telecommunications network being adapted to provide core network cellular telecommunications network functions to devices registered therewith over a non-cellular telecommunications network bearer via another access network including a plurality of access points, the method comprising:
    receiving an identifier of said other access network when a device communicates with the core via an access point, the identifier including an IP address of a mobile terminal; and
    selecting a charge for providing telecommunications services in dependence upon the value of that identifier, wherein when the IP address of the mobile terminal changes, the change in IP address triggers the selection of a charge for providing telecommunications services.

24. The method of claim 23, wherein the radio access network comprises a plurality of base stations, each of which serves one of said cells, and the core network comprises a plurality of switching centers, each of said switching centers controlling a plurality of said base stations.

25. The method of claim 23, wherein said switching centers comprise GSM Mobile Switching Centers or other cellular telecommunications network Sensing Gateway Support Nodes.

26. The method of claim 23, wherein said switching centers comprise GSM Serving Gateway Support Nodes.

27. The method of claim 23, wherein the non-cellular telecommunications network bearer includes a wireless link between the mobile terminal and the access point.

28. The method of claim 27, wherein said wireless link comprises a Bluetooth link.

29. The method of claim 27, wherein said wireless link comprises a WLAN.

30. The method of claim 23, wherein said non-cellular telecommunications network bearer comprises an IP-based communications link.

31. The method of claim 30, wherein said IP-based communications link includes the Internet.

32. The method of claim 23, wherein the identifier of said other access network is obtained by determining the domain name corresponding to the IP address of the mobile terminal allocated by the access point.

33. The method of claim 32, wherein, when the domain name changes, the domain name change triggers the selection of a charge for providing telecommunications services.

34. The method of claim 32, wherein said domain name is obtained from a Domain Name Server.

35. The method of claim 23, further comprising authenticating said devices with the core network when said devices obtain functions therefrom via said radio access network.

36. The method of claim 23, further comprising authenticating said devices with the core network when said devices obtain functions therefrom via said other access network.

37. The method of claim 36, wherein said charge is selected in dependence upon whether said authentication means is able to authenticate a said device connected to a particular access point.

38. The method of claim 23, wherein the charge is selected in dependence upon the commercial relationship between the user of said device and said other access network used thereby.

39. The method of claim 23, wherein the charge is selected in dependence upon the commercial relationship between said other access network used by said device and the cellular telecommunications network.

40. The method of claim 23, wherein the network is a GSM network.

41. The method of claim 23, wherein the network is a 3G (UMTS) network.

42. The method of claim 23, including indicating the selection of a charge for using telecommunications services to the user of the mobile terminal.

43. The method of claim 42, further comprising indicating said charge.

44. The method of claim 23, wherein the charge for providing telecommunications services is selected in dependence upon the cell last determined to be occupied by the mobile terminal.

* * * * *

UNITED STATES PATENT AND TRADEMARK OFFICE
CERTIFICATE OF CORRECTION

PATENT NO. : 7,305,229 B2  
APPLICATION NO. : 11/181005  
DATED : December 4, 2007  
INVENTOR(S) : Fox et al.

Page 1 of 1

It is certified that error appears in the above-identified patent and that said Letters Patent is hereby corrected as shown below:

Drawings  
Sheet 1, FIG. 1, change reference "7A" to --7--

Column 4  
Line 5, change "MSC 6" to --MSC 2--

Column 6  
Line 31, change "24" to --20--  
Line 35, change "24" to --20--  
Line 36, change "20" to --24--

Column 7  
Line 4, change "24" to --20--  
Line 5, change "24" to --20--

Column 8  
Line 52, change "a IPSec" to --an IPSec--

Signed and Sealed this  
Fourth Day of January, 2011

David J. Kappos  
*Director of the United States Patent and Trademark Office*